Jan. 27, 1970
E. K. DALTON ET AL
3,492,396
AGGLUTINATE SEPARATION METHOD AND APPARATUS
Filed March 13, 1967
2 Sheets-Sheet 1
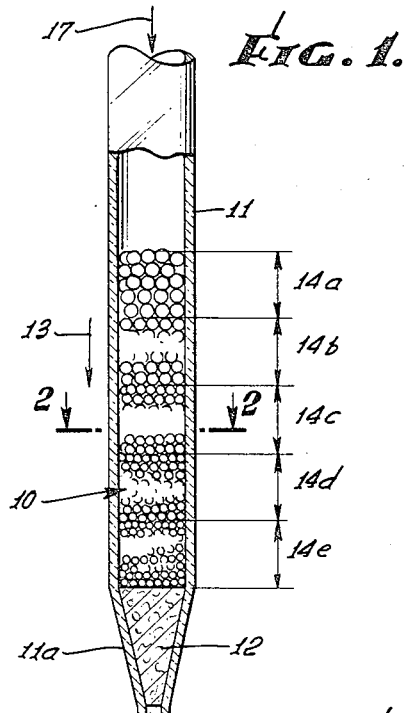
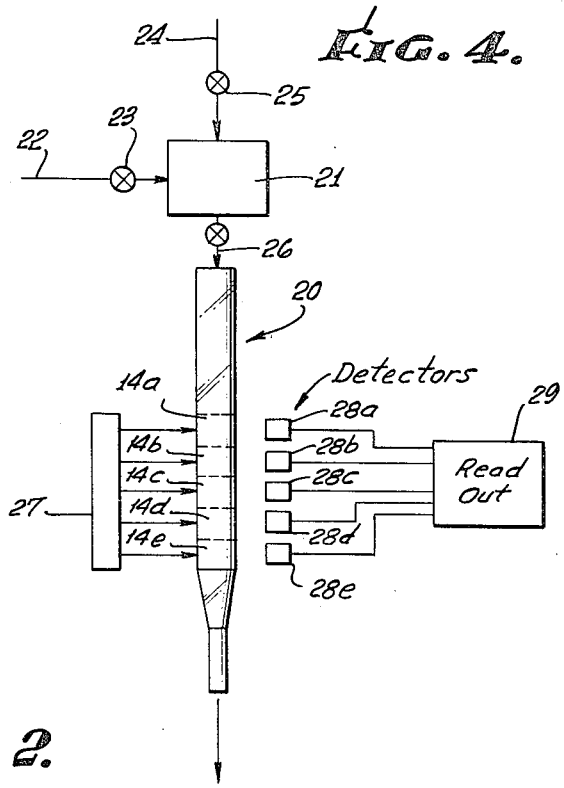
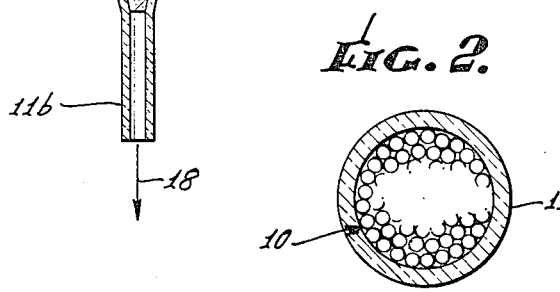
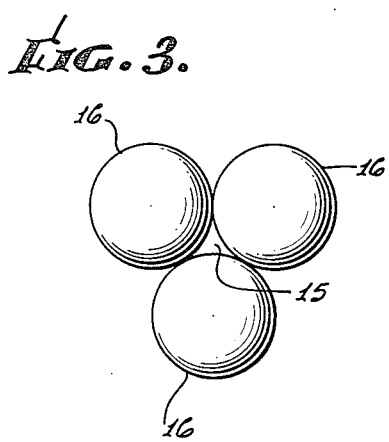
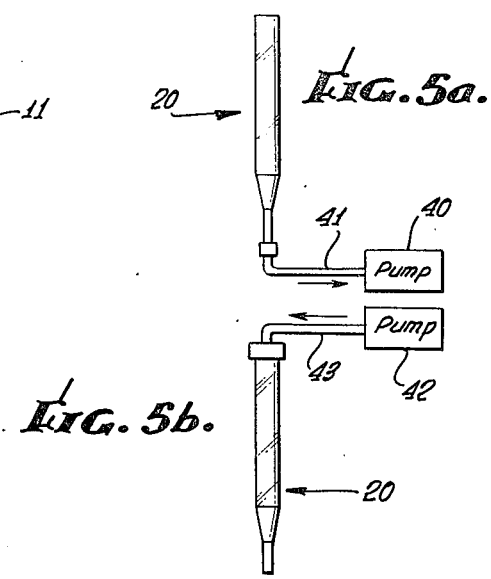
INVENTOR.
EDWARD K. DALTON
WILLIAM KEITH ROSS WATSON
BY White & Haefliger
ATTORNEYS.

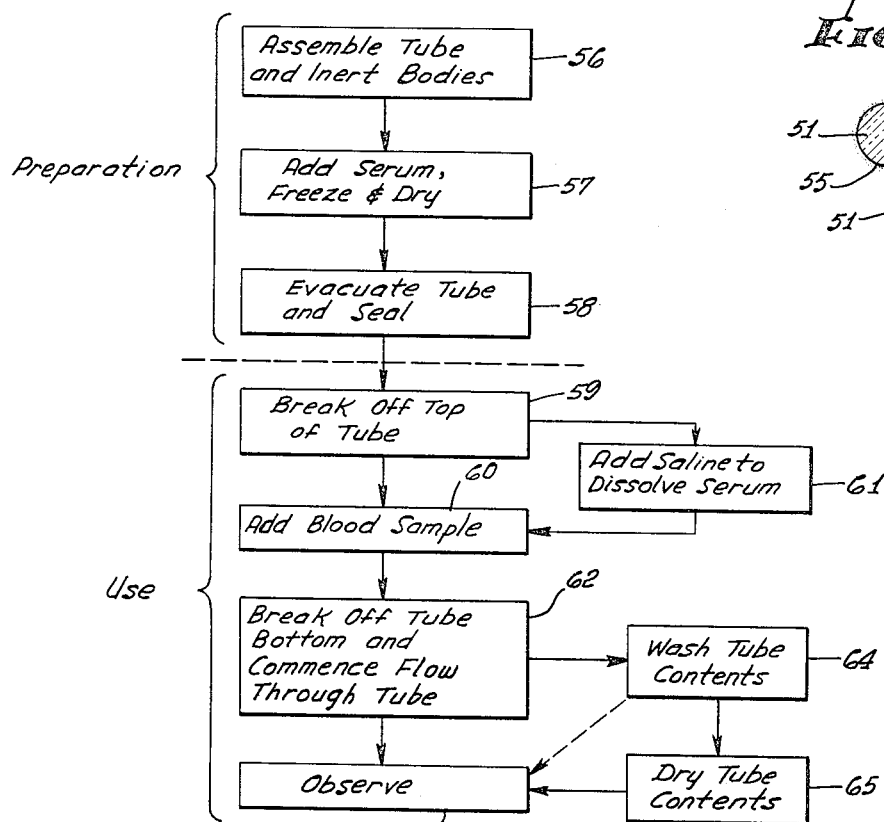
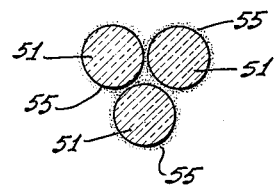
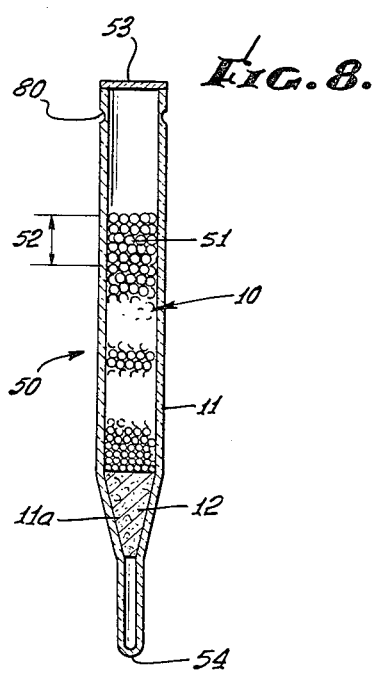
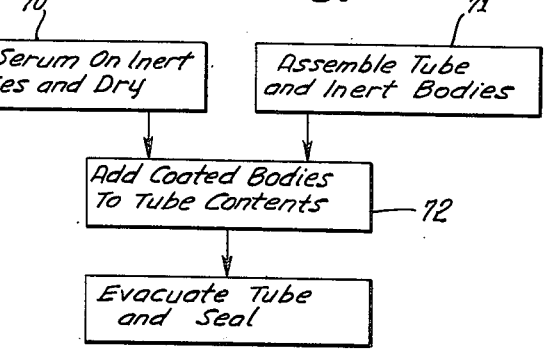

3,492,396
Patented Jan. 27, 1970

3,492,396
AGGLUTINATE SEPARATION METHOD AND APPARATUS
Edward K. Dalton, Laguna Beach, and William Keith Ross Watson, Corona del Mar, Calif., assignors to Becton, Dickinson & Co., Newport Beach, Calif., a corporation of New Jersey
Filed Mar. 13, 1967, Ser. No. 622,701
Int. Cl. A61b 5/00; B01d 23/10
U.S. Cl. 424—12    41 Claims

ABSTRACT OF THE DISCLOSURE

Method and apparatus for determining the degree of cell agglutination in a liquid sample. The sample is passed through a porous mass defined by essentially transparent inert solid bodies for filtering agglutinates to be displayed along the flow path. The bodies may typically consist of beads arranged in a column with sizes diminishing in the downstream flow direction for selectively filtering different sized agglutinates in dispersed concentrations, as in stages, to facilitate rapid analysis.

Background of the invention

This invention relates generally to separation of various size agglutinates or cell clusters. More specifically, the invention concerns simple method and apparatus for quickly determining the degree of agglutination or cell clustering in liquids, one example consisting of formation of agglutinates in a blood cell and serum mixture. While the invention will be primarily described with reference to the latter, it has other filtering applications, and in this regard, the term "agglutination" will be understood to include cell clustering as well as antigen-antibody reaction products.

Present techniques for detecting the degree of clustering of red blood cells include centrifuging of serum and blood in a test tube which tends to pack all heavier cell clusters in one zone, and simple visual evaluation of blood agglutinates, as on a microscope slide. Both of these methods yield less than desirable results, because the relative percentages of cell clusters of different sizes remain essentially unknown. Other laboratory tests used to detect agglutination include observation of sedimentation rates, which are relatively slow, and running a sample through an electronic counter which counts the cells individually. It is clear that a rapid and accurate technique that would yield information as to percentage agglutination or agglutinate size distribution is greatly needed and would markedly contribute to saving lives in transfusion cases.

Summary of the invention

The present invention has as its major object the provision of rapid and accurate method and apparatus for use in determining the degree of cell agglutination in a liquid sample. The method basically compirses arranging essentially transparent inert solid bodies (as for example glass or plastic beads) in a porous mass defining a liquid flow path or zone for filtering agglutinates to be displayed along the flow path, and effecting flow of the agglutinate containing sample along the flow path. Typically, beads are arranged in a column and in layers of different sized beads, with sizes diminishing in the downstream flow direction for selectively filtering different sized agglutinates in dispersed concentrations, the bulk of the beads having average sizes within the range 50 to 500 microns. The small size may run 30 microns or even smaller in some cases, as when it is desired to retain single cells but to pass the free hemoglobin, as when checking for hemolysis. As a result, larger agglutinates are filtered by the larger beads at one known location (bead layer interface) and smaller agglutinates are filtered by smaller beads at other known column locations, the relative sizes of the separated agglutinates are known, and th concentrations of the different sized agglutinates at the predetermined locations can be rapidly determined by differential color display. As will be seen, the use of transparent beads in a transparent tube facilitates light transmission through the filtered agglutinates and detection of the light intensity passed by the agglutinates for concentraiton determination.

Additional method steps yielding unusually beneficial results include enhancing the flow through the beads by progressively reducing the flow area in the downstream direction and to an extent progressively enhancing capillarity developed between the flow and the flow boundary in the downstream direction; providing a transparent wall tube containing a porous plug, and introducing the bodies or beads into the tube upstream of the plug; continuing the flow until different sized agglutinates are filtered in dispersed concentrations displayed in stages along the flow path, and after discontinuing the flow retaining the agglutinates in dispersed concentration display configudation for subsequent evaluation; and determining differential agglutination concentration along the flow path by transmitting electromagnetic radiation through the mass at different locations therealong, and detecting the effect of such transmission. Since the agglutinates of different sizes are separated along the flow paths with color roughly indicating concentration, a quick visual evaluation of the extent of agglutination can be made, i.e. if the coloring at the larger beads remains almost unchanged but coloring at the smaller beads is slightly reddish, it can be deduced that agglutination is relatively small.

Further method steps include supporting one reactant in a bead containing tube, as for example in powder form, to be readily dissolved in the other reactant introduced during analysis; maintaining the tube sealed prior to addition of the other reactant; and inhibiting flow of the combined reactants through the bead column for sufficient time to allow agglutination to occur.

In its apparatus aspects, the invention basically comprises a porous mass of light transmitting bodies arranged to receive liquid flow along a flow path with body sizes predetermined along that path for selectively filtering flow particles and in dispersed concentration displayed along the flow path, together with a retainer for the mass, typically a transparent wall tube. The bodies typically have average sizes within the range mentioned above and may advantageously consist of glass or plastic beads arranged in a column with bead sizes diminishing in the downstream direction, as in different bead size layers, for selectively filtering different sized particles in stages. As will appear, the tube may be sealed and contain a serum reactant in dry powder form, in position for agglutination reaction with a blood sample added to the tube.

Additionally, the retainer tube may advantageously taper in the downstream direction beyond the bodies to establish capillarity between the tube and flow acting to draw the flow through the porous mass; a porous plug in the tube may typically retain the bodies in the tube; and means to detect differential filtered particle or agglutinate concentration in different bead layers typically includes a radiation source located to effect transmission of electromagnetic radiation through the particle concentrations, and detector structure located to detect the effect of such transmission.

These and other objects and advantages of the invention, as well as the details of illustrative embodiments, will be more fully understood from the following detailed description of the drawings, in which:

Brief description of the drawing

FIG. 1 is a vertical section taken through one preferred form of the apparatus;

FIG. 2 is an enlarged section taken on line 2—2 of FIG. 1;

FIG. 3 is a view showing three close packed spherical beads;

FIG. 4 is a schematic showing of agglutination detection;

FIGS. 5a and 5b illustrate flow enhancement in the tube;

FIGS. 6 and 9 are flow diagrams illustrating preparation and use of modified apparatus;

FIG. 7 is a view like FIG. 3, but showing reactant powder coating certain beads; and FIG. 8 is a section showing a modified tube and bead construction.

Description of the preferred embodiments

Referring first to FIGS. 1 and 2, essentially transparent, inert solid bodies are arranged in a porous mass 10 defining a liquid flow path for filtering particles such as agglutinates to be displayed along the flow path. Typically, the arrangement of the bodies is carried out by providing a transparent wall tube 11, for example consisting of glass, into which the bodies are introduced upstream of a porous plug 12 previously inserted into the tube. The plug may typically consist of glass wool and be retained in the narrowed, or downstream tapered, portion 11a of the tube.

The transparent bodies in the column mass 10 preferably consist of solid, substantially spherical beads having sizes diminishing in the downstream flow direction, indicated by arrow 13, for selectively filtering different sized agglutinates in concentrations dispersed along the length of the mass 10. Thus, for example, sequential layers of closely packed beads are indicated at 14a–14e, for selectively filtering agglutinates in corresponding size stages, beads in each layer being substantially the same size and beads in successive layers 14a–14e being smaller to reduce the flow passing interstices between the beads. Accordingly, relatively larger cell clusters will be removed from the flow at layer 14a through inability to pass through the larger interstices, and the sizes of the cell clusters removed at succeeding layers will diminish.

Referring to FIG. 3, the shape of the interstice 15 between the three closely packed spherical beads 16 is roughly triangular, and it is found that cells or cell clusters of a size less than about ⅙ the diameter of a bead 16 will pass through the interstice 15, whereas cells or cell clusters of a size greater than about ⅙ the diameter of a bead 16 will be retained or filtered. Individual human red blood cells will pass through the interstice 15 if the beads 16 are above about 50 microns in diameter, but a cluster of two or more such cells generally will not pass through. It is found that agglutinates of interest in blood typing will be filtered in stages in accordance with the invention where the bulk of the beads in the mass 10 have average sizes within the range 50 to 500 microns. As an example, the beads in layer 14e may have diameters $d_5$ of about 50 microns, the beads in layer 14a may have diameters $d_1$ of about 500 microns, and the beads in successive layers 14b, 14d and 14c may have diameters $d_2$, $d_3$ and $d_4$ defined as follows:

500 microns $> d_2 > d_3 > d_4 >$ 50 microns. Also, the beads may typically consist of inert transparent material such as glass or suitable plastic.

Agglutinate containing liquid introduced into the tube 10, as indicated by arrow 17, may typically consist of a saline solution containing cell clusters formed as by reaction of blood with a serum, serum being the liquid remaining after cells and fibrinogen are removed from whole blood. Alternatively, the arrow 17 may represent separate introduction into the tube of agglutinate producing cell and serum reactants, for combination in the tube. In this regard, agglutinates may form in a mixture of blood cells from one person (donor) and plasma or serum obtained from blood of another person (recipient) by the well know antigen-antibody reaction, antigens being found on the red blood cells of the donor and antibodies in the serum of the recipient. Agglutination is a harmful reaction and indicates incompatibility as between the two bloods.

One highly advantageous result afforded by the invention is the rapidity with which the agglutinate separation from the flow can be effected, the process requiring only a few minutes. Toward this end, the flow is enhanced by provision of the tube tapered extension 11a and substantially reduced diameter portion 11b, whereby the flow area is reduced to an extent enhancing capillarity development between the flow and the tube downstream of the plug 12. Accordingly, liquid flows through the tube as assisted by capillary forces, and discharges at 18. This construction also facilitates initial inhibiting of the flow as for example by sealing of the reduced diameter portion 11b, as may be desired where agglutinate producing cell and serum reactants are combined for reaction in the tube, and adjacent layer 14a. The sealed portion 11b may be opened when flow is to be commenced.

Turning now to FIG. 4, a bead containing tube of the same construction as in FIG. 1 is indicated generally at 20. The numeral 21 indicates a homogenizing chamber into which a known volume of blood and serum are initially introduced at 22 via a valve 23. After thorough mixing in the chamber, saline solution is introduced to the chamber at 24 via valve 25, and the resultant homogenized blood and serum in saline solution is introduced at 26 to the bead containing tube 20. As before, cell clusters or agglutinates of progressively reduced sizes collect at the zones or layers 14a–14e. Thereafter, for accurate analysis, electromagnetic radiation such as light from a source 27 is directed transversely through the zones 14a–14e, via the transparent tube wall. Detectors 28a–28e are located at the opposite side of the tube to detect the effect of radiation transmission into the zones 14a–14e, the detector outputs being fed to suitable calibrated readout apparatus 29 for rapid analysis. As an example, the higher the concentration of agglutinates in a zone such as 14a, the darker will be the red coloring at the zone increasing the extent of light filtering detectable by detector 28a. Therefore, the readout may be in the terms of percentage agglutination in predetermined size ranges per known unit volume of blood and serum mixture.

Referring now to FIGS. 5a and 5b, bead containing tubes of the same construction as in FIG. 1 are indicated at 20. Combined with such tubes are means for applying gaseous pressure gradients to the tube interiors for promoting flow through beads of the agglutinate containing liquid. In FIG. 5a such means takes the form of a pump 40 connected at 41 to apply suction to the discharge end of the tube. A pump 42 is shown in FIG. 5b as connected at 43 to apply gas pressure to the entrance end of the tube.

A further aspect of the invention has to do with simplifying and speeding up the analysis of cell agglutination produced upon combination of cell and serum reactants, using the basic tube and inert body combination. To this end, the invention contemplates that the tube be prepared to initially contain one of the reactants, and that the other reactant be introduced to the tube for combination therein with the one reactant, followed by flow of the combinate along the path through the beads for filtering any agglutinates. For example, serum known as "anti-A" serum may be preliminarily contained in the tube, so that if unknown type blood is then introduced and the combination produces a dispersion of filtered agglutinates, the technician will be quickly apprised of the fact that the blood sample is of type A.

In this regard, FIG. 8 shows a tube 50 of the same construction as appears in FIG. 1, excepting that serum coats the added glass beads 51 in the zone 52 at the upstream end of the remainder of the mass 10. Also, the tube is sealed at its entrance and exit ends 53 and 54. In one highly advantageous embodiment, the serum coating the beads appears at 55 in FIG. 7 in the form of a dry powder, capable of rapid solution in the liquid blood sample added to the tube following breaking off of the tube end or seal 53 with the aid of the scoring 80.

Referring to FIG. 6, certain steps in the preparation and use of the FIG. 8 device are illustrated in block form. First, the block 56 illustrates initial assembly of the porous plug 12 and mass of beads 10 into the transparent tube 11, the inlet and exit ends of which are open. Following such assembly, the beads 51 are added to the top of the mass, and they may typically but not necessarily be of size larger than the top most layer in mass 10, i.e. over 500 microns for example. Liquid form reactant such as serum is then added to the tube to coat the beads 51, and before it can appreciably penetrate the mass 10 the reactant is frozen as by quickly dipping the tube into liquid nitrogen.

Thereafter, the tube is subjected to such gaseous evacuation, as by pumping to a tube interior pressure less than .1 micron of Hg to dry the frozen serum by sublimation, producing a powdery coating on the beads 51. Other drying methods, such as large scale commercial drying techniques with phosphorus pentachloride, can be used as an alternative to freeze drying, provided that the particular method used leaves an appropriate soluble residue. Such a coating has the advantageous characteristic that it is rapidly soluble in a liquid blood sample introduced into the tube at the beads 51, whereas a dried serum coating on the beads which is not powdery or finely divided will be much less capable of dissolving in the added blood sample. Also, the dried serum tends to support and hold the beads 51 in position in the tube. Finally, advantageous color coding results, as from the yellow and blue colors of lyophilized anti-B and anti-A serums respectively. The evacuated tube is then sealed at both ends 53 and 54 to complete its preparation. Blocks 57 and 58 indicate the order of these steps. An alternative to sealing off an evacuated tube is to fill the tube with a dry gas and seal it off.

In using the tube, as seen in FIG. 6, the sealed top 53 is broken off at scoring 80, and a liquid blood sample is introduced, as indicated by blocks 59 and 60. An extra step seen at 61 consists in preliminarily dissolving the powdery serum coating as by adding a small amount of standard saline solution sufficient to wet the top beads 51, and if this is done the blood sample is immediately added. At this time, flow through the mass of beads 10 is inhibited due to the fact that the bottom of the tube 11 remains sealed, whereby the agglutination reaction may occur to significant extent before such flow and filtering.

Following the agglutination reaction interval, the bottom of the tube is opened up, as by breaking it off, and downward flow of the agglutinate containing liquid commences through the mass of beads 10, as described in connection with FIG. 1. Block 62 in FIG. 6 illustrates this step. Filtered agglutinates may then be observed, through the transparent tube wall, as indicated by block 63. Blocks 64 and 65 indicated optional added steps of washing the tube contents with normal saline solution, and drying such contents, to promote observation clarity. Such drying prevents migration of color boundaries produced by discrete stage filtering.

The modification of the method depicted in FIG. 9 involves preliminary coating or freeze drying of the serum on the beads 51 outside the tube; assembly of the tube and inert body mass 10; and addition of the coated beads into the assembled tube, as represented by blocks 70, 71 and 72 respectively. Thereafter, the tube is sealed and used as in FIG. 6.

We claim:
1. In the method of analysing cell agglutination in a liquid sample, the steps that include:
arranging essentially transparent inert solid bodies of predetermined size distribution in a porous mass defining a liquid flow path for filtering agglutinates to be displayed along said path,
and effecting flow of the sample along said path through said mass.
2. The method of claim 1 wherein the bulk of the bodies have average sizes within the range 50 to 500 microns.
3. The method of claim 1 wherein said bodies consist of beads arranged in a column with layers of beads possessing bead sizes diminishing in the downstream flow direction for selectively filtering different sized agglutinates in dispersed concentrations.
4. The method of claim 1 including the step of enhancing said flow by constricting the flow area in the downstream direction and to an extent enhancing capillarity developed between the flow and the flow boundary in the downstream direction.
5. The method of claim 1 wherein said arranging step is carried out by providing a transparent wall tube containing a porous plug and introducing said bodies into the tube upstream of the plug.
6. The method of claim 5 including the step of enhancing said flow by providing an extension of said tube that progressively reduces the flow area in the downstream direction and to an extent progressively enhancing capillarity developed between the flow and the tube downstream of said plug.
7. The method of claim 1 wherein the liquid sample contains blood cells and serum.
8. The method of claim 1 including the step of continuing said flow until said different sized agglutinates are filtered in dispersed concentrations displayed along said path.
9. The method of claim 8 including the steps of discontinuing said flow, and retaining said agglutinates in dispersed concentration display configuration for subsequent evaluation.
10. The method of claim 8 including determining differential agglutination concentration along said path by transmitting electromagnetic radiation through the mass at different locations therealong and detecting the effect of such transmission.
11. Apparatus of the character described, comprising a porous mass of light transmitting bodies arranged to receive liquid flow along a flow path with body sizes predetermined along the flow path for selectively filtering flow particles and in dispersed concentration displayed along said path, and a retainer for said mass, said bodies consisting of transparent beads arranged in a column with bead sizes diminishing in the downstream flow direction for selectively filtering different sized particles in stages, the bulk of said beads having average sizes within the range of from about 30 microns to 500 microns.
12. Apparatus as defined in claim 11 wherein said retainer comprises a transparent wall tube.
13. Apparatus as defined in claim 11 wherein the flow path has progressively reduced area in the downstream direction and to an extent progressively enhancing capillarity developed between the flow and the retainer.
14. Apparatus as defined in claim 12 wherein said tube tapers in the downstream direction beyond said bodies to establish capillarity between the flow and the tube acting to draw said flow through said mass.
15. Apparatus as defined in claim 12 including a porous plug in the tube to retain the bodies in a column in the tube.
16. Apparatus of the character described, comprising a porous mass of light transmitting bodies arranged to receive liquid flow along a flow path with body sizes predetermined along the flow path for selectively filtering flow particles and in dispersed concentration displayed along said path, a retainer for said mass, and means to introduce a liquid sample consisting of blood and serum into said retainer for reception by said mass, the sample containing agglutinates defining said particles.

17. Apparatus of the character described, comprising a porous mass of light transmitting bodies arranged to receive liquid flow along a flow path with body sizes predetermined along the flow path for selectively filtering flow particles and in dispersed concentration displayed along said path, a retainer for said mass, said bodies consisting of transparent beads arranged in a column with bead sizes diminishing in the downstream flow direction for selectively filtering different sized particles in stages, and means to detect differential particle concentration along said path, said means including a radiation source located to effect transmission of electromagnetic radiation through the particle concentrations displayed along the flow path, and detector structure located to detect the effect of said transmission.

18. Apparatus of the character described, comprising a porous mass of essentially transparent bodies arranged to receive liquid flow along a flow path with the sizes of the spaces between the bodies diminishing in the downstream flow direction for selectively filtering flow particles of different size and in dispersed concentrations displayed along said path, and a retainer for said mass, the bulk of said bodies having average sizes within the range of from about 30 microns to 500 microns.

19. Apparatus as defined in claim 11 including means connected to apply a gaseous pressure gradient to the tube interior for promoting said flow.

20. Apparatus as defined in claim 12 wherein said tube is sealed.

21 Apparatus of the character described, comprising a porous mass of light transmitting bodies arranged to receive liquid flow along a flow path with body sizes predetermined along the flow path for selectively filtering flow particles and in dispersed concentration displayed along said path, a retainer in the form of a transparent wall tube for said mass, said apparatus being adapted for rapid analysis of cell agglutination produced upon combination of cell and serum reactants, and one of said reactants being contained by the tube for combination with the other reactant to be introduced into the tube.

22. Apapratus as defined in claim 21, wherein said one reactant is in finely divided dry form.

23. Apparatus as defined in claim 22, wherein said dry form reactant coats said bodies at the upstream end portion of said path.

24. The method of claim 1, in which the flow is promited by applying a gaseous pressure gradient to the tube interior.

25. In the method of analysing cell agglutination through use of a tube containing inert solid bodies in a porous mass defining a liquid flow path for filtering agglutinates to be displayed along the path, the steps that include:
   combing agglutinate producing cell and serum reactants,
   and effecting flow of the combined reactants along said path to filter agglutinates for display.

26. The method of claim 25 wherein the combined reactants are introduced into said tube following their combination.

27. The method of claim 25 wherein the reactants are introduced into said tube to be combined therein.

28. The method of claim 27 including the steps of inhibiting the flow of the combined reactants along said path in the tube for a time sufficient to allow agglutinates to form, and thereafter effecting said flow along said path.

29. The method of claim 25 wherein the tube initially contains one of said reactants, and said combining step is carried out by introducing the other reactant to the tube for combination therein with said one reactant followed by flow along said path.

30. The method of claim 29 wherein said one reacant initially coats certain of said inert solid bodies proximate the beginning of said path, before said combining step.

31. The method of clam 25 wherein the tube is initially sealed, and including the steps of opening the tube proximate one end thereof, introducing at least one of the reactants into the opened tube for reactant combination in the tube, inhibiting flow of the combined reactants along said path in the tube for a time sufficient to allow agglutinates to form, and opening the tube proximate the opposite end thereof to effect said flow.

32. The method of claim 31 including the steps of introducing saline solution into the tube to wash the tube contents and drying the tube contents.

33. The method of preparing apapratus for rapid analysis of cell agglutination produced upon combination of cell and serum reactants that includes providing a transparent wall tube, and introducing into and supporting in the tube a porous mass of light transmitting inert bodies defining a liquid path for filtering agglutinates to be displayed along said path.

34. The method of claim 33 including the step of supporting one of said reactants in dry form in the tube, and sealing the tube.

35. The method of claim 34 including the step of supporting said dry form reactant on inert bodies at the upstream end portion of said flow path.

36. The method of claim 35 wherein said supporting step is effected by contacting certain of said bodies with said one reactant in liquid form, freezing said one reactant on said certain bodies, and drying said frozen reactant to powder form.

37. In the method of analyzing cell agglutination through use of a duct containing bodies in a porous mass defining a liquid flow path, the bodies sized for filtering agglutinates to be displayed along said path, the steps that include
   combining agglutinate producing cell and serum reactants,
   and effecting flow of the combined reactants along said path to filter agglutinates for display along said said path.

38. The method of claim 37 including the preliminary step of arranging said bodies to have sizes diminishing in the downstream flow direction for selectively filtering different sized agglutinates in dispersed concentrations.

39. The method of claim 38 including transmitting radiation into the filtered agglutinates at different locations along said flow direction, and detecting differences in radiation transmission through said agglutinates at said different locations thereby to determine differential agglutination concentration along said path.

40. In apparatus of the character described for analyzing cell agglutination,
   a porous mass of bodies arranged to receive flow of liquid containing cell agglutinates and along a flow path,
   the body sizes predetermined along the flow path for selectively filtering said agglutinates and in dispersed concentrations displayed along said path,
   and a retainer for said mass.

41. Apparatus as defined in claim 40 including means for transmitting radiation into the porous mass at different filtered agglutinate locations along said flow path. and means responsive to said radiation transmission for determining differential agglutinate concentrations along said path.

(References on following page)

References Cited

UNITED STATES PATENTS

| | | | |
|---|---|---|---|
| 2,462,612 | 2/1949 | Craig | 210—280 |
| 3,352,197 | 11/1967 | Porges et al. | 210—94 |
| 3,382,983 | 5/1968 | Stewart | 210—290 XR |
| 3,392,834 | 7/1968 | Christensen | 210—94 |

FOREIGN PATENTS 12,072  6/1895  Great Britain.

MORRIS O. WOLK, Primary Examiner

R. E. SERWIN, Assistant Examiner

U.S. Cl. X.R.

23—230; 23—253; 73—61, 64.1; 210—94, 290; 356—39